United States Patent [19]
Wright

[11] Patent Number: 6,110,381
[45] Date of Patent: *Aug. 29, 2000

[54] METHOD AND COMPOSITION FOR INHIBITING MICROBIAL ADHESION ON SURFACES

[75] Inventor: J. Barry Wright, Jacksonville, Fla.

[73] Assignee: BetzDearborn Inc., Trevose, Pa.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/867,135

[22] Filed: Jun. 2, 1997

Related U.S. Application Data

[63] Continuation-in-part of application No. 08/635,124, Apr. 19, 1996, abandoned.

[51] Int. Cl.$^7$ ............... C02F 1/50; D21H 17/09; B01F 17/10
[52] U.S. Cl. ............... 210/698; 162/48; 162/158; 516/200
[58] Field of Search ............... 252/354; 424/405; 162/48, 161, 158; 210/764, 698; 516/200, 909; 106/2

[56] References Cited

U.S. PATENT DOCUMENTS

| | | | |
|---|---|---|---|
| 2,121,616 | 6/1938 | Werntz | 252/354 |
| 4,285,765 | 8/1981 | Pera et al. | 162/161 |
| 4,289,581 | 9/1981 | Katayama et al. | 210/764 |
| 4,295,932 | 10/1981 | Pocius | 210/764 |
| 4,582,702 | 4/1986 | Grollier | 424/52 |
| 4,828,849 | 5/1989 | Lynch et al. | 424/52 |
| 4,975,109 | 12/1990 | Friedman, Jr. et al. | 162/161 |
| 4,976,874 | 12/1990 | Gannon et al. | 210/764 |
| 5,048,199 | 9/1991 | Cole | 34/349 |
| 5,380,756 | 1/1995 | Andrews et al. | 514/552 |
| 5,439,681 | 8/1995 | Khan et al. | 424/405 |
| 5,512,186 | 4/1996 | Wright et al. | 210/764 |
| 5,512,211 | 4/1996 | McSwigan et al. | 516/200 |
| 5,549,847 | 8/1996 | Goliro et al. | 252/311 |
| 5,573,641 | 11/1996 | Meade et al. | 162/161 |
| 5,593,599 | 1/1997 | Wright et al. | 210/764 |
| 5,607,597 | 3/1997 | Wright et al. | 210/755 |
| 5,670,055 | 9/1997 | Yu et al. | 210/698 |
| 5,736,058 | 4/1998 | Wright et al. | 210/698 |
| 5,762,757 | 6/1998 | Nguyen et al. | 162/158 |
| 5,908,582 | 6/1999 | Feustel et al. | 516/200 |
| 5,942,219 | 8/1999 | Hendriks | 106/2 |

FOREIGN PATENT DOCUMENTS

| | | |
|---|---|---|
| 0302701 | 2/1989 | European Pat. Off. . |
| 43 25 923 A1 | 2/1995 | Germany . |

OTHER PUBLICATIONS

Tetronic® Block Copolymer Surfactants, Downloaded from webside www. basf.com/businesses/chemicals/performance/html/tetronic.html on Aug. 3, 1999.

Pluronic® Block Copolymer Surfactants, downloaded from website www. basf.com/businesses/chemicals/performance//html/pluronic_grid_java.html on Aug. 3, 1999.

Database WPI, week 8127, London: Derwent Publications, Ldt., AN—81—48872D, Class A10, J56057888–A (Lion Corp.) abstract, 1981.

Database WPIL, week 9502, London: Derwent Publications, Ltd., AN—95—009516, Class A01, JP6293607 A (Tokuyama Soda KK) abstract, 1995.

Database WPIL, week 9502, London: Derwent Publications, Ltd., AN—95—011/11, class A01, JP6298603 (Takeda Chem Ind Co. Ltd ) abstract, 1995.

Database WPIDS on STN, week 9511, London: Derwent Publications Ltd., AN 95–075624, Class A25, DE 43 25 923 A1 (Henkel KGaA), abstract, 1995.

Blainey et al., "The Use of Block Copolymers to Inhibit Bacterial Adhension," *Biofouling*, 1991, vol. 4, pp. 308–318.

Hales, Biodegradation of the Anionic Surfactant Dialkyl Sulphosuccinate:, *Environmental Toxicology and Chemistry*, 1993, vol. 12, pp. 1821–1828.

Humphries et al., "The Use of Nonionic Ethoxylated and Propoxylated Surfactants to Prevent the Adhension of Bacteria to Solid Surfaces", *FEMS Microbiology Letters*, 1987. vol. 42, pp. 91–101.

Aberini et al., 1992, Comparative inhibition of *Acinetobacterium wieringae* by two non–ionic surfactants; Tween 20 and ATPlus 258, *Biotech Lett*. 14;727–732.

Budtz–JØrgensen et al., 1991, The use of block copolymers to inhibit bacterial adhesion and biofilm formation on hydrophobic surfaces in marine habitats, *Biofouling* 4:309–318.

Costerton, 1984, The effect of Octapinol, a substance with low antibacterial activity, on denture plaque and denture–induced stomatitis, *Clinical Preventive Dentistry* 6:23–27.

Lamikanra et al., 1976, The antibacterial activity of non–ionic surface–active agents, *Microbias Letters* 1:97–101.

*Primary Examiner*—Richard D. Lovering
*Assistant Examiner*—Daniel S. Metzmaier
*Attorney, Agent, or Firm*—Greenblum & Bernstein, P.L.C.

[57] ABSTRACT

A treatment for inhibiting the microbial adhesion on surfaces in contact with an aqueous system is disclosed, which comprises adding to the system the combination of a dioctylsulfosuccinate surfactant and a polyoxyethylene-polyoxypropylene block copolymer.

10 Claims, No Drawings

METHOD AND COMPOSITION FOR INHIBITING MICROBIAL ADHESION ON SURFACES

This application is a continuation-in-part of Ser. No. 08/635,124, filed Apr. 19, 1996, now abandoned.

BACKGROUND OF THE INVENTION

Bacterial attachment to surfaces in virtually any non-sterile aquatic environment is a well-established phenomenon. Industrial efforts to prevent colonization or to clean fouled surfaces amount to costly expenditures in a number of industrial sectors. Often, such expenditures are made for cleaning programs that include the use of surfactants. Surfactants are regularly employed in water treatment programs as agents believed to play a role in the removal of organic masses from surfaces, in the enhancement of biocide efficacy or in improving the water miscibility of various biocidal agents. Surfactants are also regularly used in the agrichemical business, particularly to enhance the action of herbicides. This is accomplished by using the surfactants to alter the surface behavior of the applied droplets, maximizing their interaction with the leaf surface.

One of the desirable benefits of many surfactants is their relative handling safety due to the low mammalian toxicity of many of these compounds. Additionally, many surfactants are also biodegradable. These properties have resulted in increased attention being paid to these materials as process treatment chemicals that may allow for the reduction or elimination of some proportion of the less environmentally sensitive compounds currently in regular use.

There are numerous examples of surfactants which are able to inhibit the colonization of surfaces by inhibiting the overall growth of the organisms in the target environment. Most surfactants, regardless of class, show some inhibition of surface colonization when used at concentrations high enough to impede bacterial growth. In the water treatment industry, the most well known surfactants which impart a measure of colonization resistance to submerged surfaces are the cationic quaternary amine surfactants, which also function as biocides. However, even the relatively mild nonionic surfactants can exhibit toxic effects upon microbes, e.g., bacteria or fungi; the concentration of nonionic surfactants necessary to mediate toxicity is typically substantially higher than for cationic surfactants, however.

In addition, the use of surfactants at high concentrations typically results in the discharge of large amounts of the surfactant into water treatment facilities or into the environment. Depending on the specific surfactant, the release of large quantities of these materials into the ground water may have significant environmental consequences, particularly in the absence of rapid biodegradation.

Other examples of using surfactants to prevent adhesion of bacteria to surfaces exist in the prior art. One class of surfactant that has been seen to exhibit some degree of efficacy is the polyoxyethylene-polyoxypropylene block copolymers. These materials have been demonstrated to have limited usefulness under specific conditions. Some have demonstrated efficacy for inhibiting bacterial colonization of surfaces when applied at reasonably low levels. These materials, however, only displayed efficacy for hydrophobic surfaces.

Examples of nontoxic control of surface colonization typically require the use of high concentrations of surfactants not feasible in water treatment industries where thousands or millions of gallons of water would be treated.

The present invention relates to the use of surfactants which act by inhibiting microbial adhesion to surfaces in contact with an aqueous system. The materials of the present invention have been previously used in areas such as fiber wetting in the textile industry. These materials function to inhibit adhesion at concentrations below which toxicity has been observed for the tested organisms.

DETAILED DESCRIPTION OF THE INVENTION

The present invention relates to a method for inhibiting the microbial colonization of surfaces in contact with an aqueous system, e.g., a cooling water, pulping or papermaking system, which comprises adding to said system an effective amount of an anionic dioctylsulfosuccinate surfactant in combination with an effective amount of a nonionic polyoxyethylene-polyoxypropylene (EO-PO) block copolymer. The present invention prevents the adhesion of microbes to said surfaces while preserving the viability of the microbes in the process stream of said system, allowing for their discharge from the system.

The present invention substantially inhibits the extent of bacterial colonization of surfaces without exhibiting toxicity toward the target population, thereby allowing for the discharge of the microbes from the system. It is expected that the treatment of the present invention will also yield a waste stream that has markedly reduced mammalian toxicity, and is thus more environmentally sensitive than current protocols that rely upon toxic biocides. This "environmentally friendly" control methodology prevents bacterial attachment without reducing the number of viable microbes. Furthermore, the class of chemicals involved in this substantially non-toxic treatment of the present invention are biodegradable (alkylsulfosuccinates).

In order to demonstrate efficacy of the present invention, a method was developed which allowed for the screening of surfactant ability to inhibit the initial colonization steps. This method involved the colonization of commercially available stainless steel discs by bacteria in the presence/absence of surfactants. The number of bacteria on a set of discs was then determined by standard methods.

The bacterial species *Pseudomonas aeruginosa, (P. aeruqinosa)* was the organism chosen for these studies because this species has frequently been demonstrated to be among the primary colonizers of submerged surfaces. These organisms are also nearly ubiquitous in natural aquatic environments and could, therefore, be expected to be found in the process water streams in a variety of industries; the strain used was a paper mill isolate.

Several block copolymer surfactants as exemplified by the Pluronic® and Tetronic® classes of surfactants, available from BASF, were tested in combination with the preferred anionic sulfosuccinate of the present invention, a linear dioctylsulfosuccinate. Many of the block copolymers, although exhibiting little or no colonization inhibition at concentrations less than 100 mg/L when used alone, were seen to increase the efficacy of dioctylsulfosuccinate. The majority of these combinations resulted in control of surface colonization.

The materials that demonstrate the best enhancement of efficacy are the Pluronic surfactants that have between 10 and 50% polyoxyethylene, with molecular weights in the range of approximately 1,800 to 4,000. The following table demonstrates the efficacy of the present invention. The values reflect the amount of nucleic acid recovered from the adherent bacteria on discs exposed to the indicated treatment relative to adherent bacteria recovered from untreated discs. The preferred EO/PO block copolymer of the present invention, tested in the following Tables, is a Pluronic L-101 surfactant with a molecular weight of about 3800 and with 10% polyoxyethylene (Polymer A).

TABLE I

Colonization Inhibition Efficacy as a Function of the Addition of EO-PO Block Copolymer and/or Linear Dioctylsulfosuccinate

| Dioctylsulfosuccinate (mg/L) | Polymer A (mg/L) | Nucleic Acid Recovered as Percentage of Control (%) |
|---|---|---|
| 0 | 0 | 100 |
| 5.0 | 0 | 100 |
| 35.0 | 0 | 54.4 |
| 50.0 | 0 | 41.1 |
| 2.5 | 3.4 | 9.9 |
| 5.0 | 10.0 | 47.6 |
| 5.0 | 6.7 | 15.2 |
| 10.0 | 13.4 | 18.6 |
| 35.0 | 70.0 | 38.0 |
| 50.0 | 100.0 | 22.7 |

The above results indicate that the block copolymer is able to substantially enhance the efficacy of low concentrations of dioctylsulfosuccinate. The block copolymer, alone, failed to demonstrate any colonization inhibition at concentrations up to 200 mg/L. It is expected that treatment levels of the combination of surfactants of from about 1 ppm to 150 ppm would be effective, depending on the characteristics of the treated system.

An additional result of mixing the two surfactants is that they are each minimally water soluble. Mixing the surfactants together allows for a greater proportion of active ingredients to be mixed into a given volume of water. A preferred range of mixtures of the surfactants is from a 4:1 to 1:10 ratio of dioctylsulfosuccinate:block copolymer, with a 1:2 ratio being particularly preferred. These mixtures are generally water soluble (or dispersible) in any desired proportion.

While we have shown and described herein certain embodiments of the present invention, it is intended that there be covered as well any change or modification therein which may be made without departing from the spirit and scope of the invention.

I claim:

1. A method for inhibiting the microbial colonization of surfaces in contact with an aqueous system which comprises adding to said system from about 1–150 ppm of a combination of (a) a dioctylsulfosuccinate surfactant and (b) a polyoxyethylene-polyoxypropylene block copolymer surfactant to substantially prevent the adhesion of microbes to said surfaces while preserving the viability of the microbes in said system, allowing for the discharge of the microbes from said system, said polyoxyethylene-polyoxypropylene block copolymer surfactant exhibiting no colonization inhibition at concentrations less than 100 mg/l when used alone.

2. The method as recited in claim 1 wherein said dioctylsulfosuccinate surfactant is a linear dioctylsulfosuccinate.

3. The method as recited in claim 1 wherein said surfaces are stainless steel.

4. The method as recited in claim 1 wherein the weight ratio of (a):(b) is from about 4:1 to 1:10.

5. The method of claim 1 wherein said polyoxyethylene-polyoxypropylene block copolymer surfactant exhibits no colonization inhibition at concentrations less than 200 mg/l when used alone.

6. The method as recited in claim 1 wherein said aqueous system comprises a cooling water system.

7. The method as recited in claim 1 wherein said surfaces are acrylic, ceramic or metal.

8. The method as recited in claim 1 wherein said aqueous system comprises a pulping or papermaking system.

9. The method as recited in claim 1 wherein said aqueous system comprises a metal working system.

10. The method as recited in claim 1 wherein said aqueous system comprises an oil and gas system.

* * * * *